United States Patent
Chakravarty et al.

(10) Patent No.: US 9,178,569 B2
(45) Date of Patent: Nov. 3, 2015

(54) SYSTEM AND METHOD FOR SIMULTANEOUS WIRELESS CHARGING, TRACKING AND MONITORING OF EQUIPMENTS

(71) Applicant: Tata Consultancy Services Limited, Maharashtra (IN)

(72) Inventors: Tapas Chakravarty, Bangalore (IN); Balamuralidhar Purushothaman, Bangalore (IN)

(73) Assignee: Tata Consultancy Services Limited, Maharashtra (IN)

( * ) Notice: Subject to any disclaimer, the term of this patent is extended or adjusted under 35 U.S.C. 154(b) by 418 days.

(21) Appl. No.: 13/680,220

(22) Filed: Nov. 19, 2012

(65) Prior Publication Data
US 2013/0135084 A1 May 30, 2013

(30) Foreign Application Priority Data
Nov. 28, 2011 (IN) .......................... 3339/MUM/2011

(51) Int. Cl.
G04B 5/00 (2006.01)
H04B 5/00 (2006.01)
H02J 7/02 (2006.01)
H02J 17/00 (2006.01)

(52) U.S. Cl.
CPC .............. H04B 5/0037 (2013.01); H02J 7/025 (2013.01); H02J 17/00 (2013.01); H04B 5/0062 (2013.01)

(58) Field of Classification Search
CPC ..... H04B 5/0037; H04B 5/0062; H02J 7/025; H02J 17/00
USPC ............ 340/10.1, 572.1–572.7, 693.1–693.4, 340/539.1, 539.13, 10.33, 10.34, 10.4, 340/10.41; 455/73, 572, 574
See application file for complete search history.

(56) References Cited

U.S. PATENT DOCUMENTS

| | | | |
|---|---|---|---|
| 6,325,294 B2 | 12/2001 | Tuttle et al. | |
| 6,888,459 B2 | 5/2005 | Stilp | |
| 7,026,941 B1 * | 4/2006 | Anderson | 340/573.1 |
| 7,400,253 B2 * | 7/2008 | Cohen | 340/572.1 |
| 7,876,225 B2 | 1/2011 | Mickle et al. | |
| 8,621,245 B2 * | 12/2013 | Shearer et al. | 713/300 |
| 8,716,977 B2 * | 5/2014 | Walley et al. | 320/108 |
| 8,742,623 B1 * | 6/2014 | Biederman et al. | 307/80 |
| 8,797,146 B2 * | 8/2014 | Cook et al. | 340/10.4 |
| 2003/0104848 A1 * | 6/2003 | Brideglall | 455/574 |
| 2004/0259604 A1 * | 12/2004 | Mickle et al. | 455/572 |
| 2006/0244568 A1 * | 11/2006 | Tong et al. | 340/10.41 |
| 2006/0281435 A1 * | 12/2006 | Shearer et al. | 455/343.1 |
| 2007/0015465 A1 * | 1/2007 | Giroud et al. | 455/41.2 |
| 2007/0112274 A1 * | 5/2007 | Heitzmann et al. | 600/485 |
| 2007/0117596 A1 * | 5/2007 | Greene et al. | 455/572 |

(Continued)

Primary Examiner — Brian Zimmerman
Assistant Examiner — An T Nguyen
(74) Attorney, Agent, or Firm — Hayes Soloway PC (57) ABSTRACT

A system and method for simultaneous charging, tracking and monitoring one or more equipments, comprising actuating a coordinator using a management server for transmitting UHF radio waves; receiving the transmitted UHF radio waves by a receiver; converting the UHF radio waves into DC power by employing an energy harvesting IC for charging a battery pack of said equipment, and simultaneously activating an RFID tag for receiving one or more operational parameters related to said equipment by employing said one or more sensors and transmitting said received one or more operational parameters by using short range data communication protocol via said coordinator.

13 Claims, 4 Drawing Sheets

(56) References Cited

U.S. PATENT DOCUMENTS

| | | | |
|---|---|---|---|
| 2008/0018466 A1* | 1/2008 | Batra et al. | 340/572.1 |
| 2008/0169910 A1* | 7/2008 | Greene et al. | 340/10.34 |
| 2008/0252422 A1* | 10/2008 | Dowla et al. | 340/10.1 |
| 2009/0102296 A1* | 4/2009 | Greene et al. | 307/149 |
| 2009/0152954 A1* | 6/2009 | Le et al. | 307/110 |
| 2009/0325486 A1* | 12/2009 | Kim | 455/41.2 |
| 2010/0039234 A1* | 2/2010 | Soliven et al. | 340/10.1 |
| 2010/0090656 A1* | 4/2010 | Shearer et al. | 320/139 |
| 2010/0141153 A1* | 6/2010 | Recker et al. | 315/149 |
| 2010/0271187 A1* | 10/2010 | Uysal et al. | 340/10.4 |
| 2011/0181399 A1* | 7/2011 | Pollack et al. | 340/10.33 |
| 2011/0260839 A1* | 10/2011 | Cook et al. | 340/10.4 |
| 2012/0126982 A1* | 5/2012 | Lee et al. | 340/572.1 |
| 2012/0242481 A1* | 9/2012 | Gernandt et al. | 340/539.13 |
| 2012/0280650 A1* | 11/2012 | Kim et al. | 320/108 |
| 2012/0286935 A1* | 11/2012 | Huang | 340/10.1 |
| 2012/0326874 A1* | 12/2012 | Kwak et al. | 340/573.3 |
| 2013/0106607 A1* | 5/2013 | Clement et al. | 340/572.1 |
| 2013/0135084 A1* | 5/2013 | Chakravarty et al. | 340/10.1 |

\* cited by examiner

SYSTEM AND METHOD FOR SIMULTANEOUS WIRELESS CHARGING, TRACKING AND MONITORING OF EQUIPMENTS

FIELD OF THE INVENTION

The present application generally relates to a system and method for remote monitoring and charging battery of a device or equipment. More particularly the invention relates to remote monitoring, tracking and contactless charging of rechargeable batteries of medical equipments with sealed sterilization enclosure.

BACKGROUND OF THE INVENTION

Radio Frequency Identification also referred to as RFID is a well known method for auto-identification and tracking of an equipment or device. Specifically in hospitals asset tracking & remote monitoring of medical devices is becoming need of the hour. Further, especially in case of surgical equipments where sealable enclosure is preferred for sterilization of the equipment, it is necessary to read back or monitor vital parameters of the device such as number of use committed (for a multi-use device) without accessing the enclosed equipment. Therefore, without any external connectors or displays the only feasible method to monitor such devices is through wireless technology such as RFID.

Asset tracking by means of auto-identification utilizes RFID technology wherein an RFID tag storing a unique identification number is attached to a device or asset that uniquely defines the asset. An RFID reader is enabled to wirelessly interrogate the RFID tag attached to an asset by using RF field. Such RF field is received by the RFID tag that transmits the unique identification number to the RFID reader. An RFID tag may be a passive RFID tag that does not require a battery or an active RFID tag that requires a battery power supply. RFID system also exist wherein the RFID tag can be used either/or in passive/active mode, such RFID tags have great utility in especially in sealed devices where no physical access to the tag is possible after sealing.

Another vital need today is monitoring of devices especially in hospitals. Monitoring a device or equipment means reading a plurality of device parameters such as sensory data that requires a two-way communication between a wireless interrogator or transceiver and the device. Such a two-way communication usually requires a large amount of power, thereby draining the device battery. Low-power/Low data rate communication protocols such as Short Range Data (SRD)/IEEE 802.15.4/Bluetooth low energy (BLE) and the like are generally recommended for a two-way communication. Utilizing a global communication standard leads to communication interoperability between equipments procured from different vendors.

Further, any device driven by rechargeable batteries requires charging at regular intervals of time. RFID technology enables contactless charging of rechargeable batteries. Such contactless charging is becoming useful for medical devices especially where surgical equipments have battery sealed in an enclosure to maintain/enhance sterilization of such equipments. Contactless charging carries a far lower risk of electric shock when compared with conductive charging, as there are no exposed conductors. In case of contactless charging, the power source necessary for generating the power required to charge batteries is derived from the principles of energy harvesting. One of the methods is by deriving a DC voltage-current directly from a radio field (RF/Wireless). A typical set up consists of a radio-frequency transmitter which radiates at a given high frequency and power level as applicable. The RF field may or may not be modulated. The radiated RF field is captured by a receiver antenna and forwarded to a charging circuit; such circuit converts the RF field directly to DC at a given voltage level e.g. 3.3V. Such DC power is used to recharge batteries using trickle charging method. Majority of reliable implementations till this point of time, use near-field methods like magnetic coupling, electrostatic coupling etc which are limited to short ranges only. Longer range wireless charging method is becoming promising at UHF/microwave range (high gain antennas) and increased sensitivity of the receiver module. Ability to charge batteries using wireless over longer ranges is very useful when the battery driven device is completely sealed and batteries cannot be replaced further and where application needs permit longer hours of battery charging e.g. over night hours.

Therefore the three major potential needs for sealed equipment such as a sealed medical device are sealed enclosure with integrated battery charger & battery pack requiring contactless transfer of charge, asset tracking of such equipments especially in hospital environment, remote monitoring as well as actuation of such equipments using a management server such as hospital management server. More value addition may be brought in if the sealed equipments contain appropriate sized memory block to store critical manufacture/service data related to the particular equipment and Sensory data which will be retained for a long time.

However, only a system integration approach using standard products for incorporating all the above stated features cannot help as the space inside an equipment is a severe constraint. Further, battery power usage and very high degree of reliability is mandatory. Therefore, there is a need to devise a method that uses minimum hardware footprint, space constraint, high power efficiency, battery usage primarily reserved for the device operation, minimum interference effects, low cost and interoperability etc.

In order to solve the above mentioned problems, the present application proposes a system and method that utilizes a combination of distinct methods operating at a single frequency specifically using radio wave propagation as the fundamental physical phenomenon in a unique way to serve the need with minimalistic hardware.

Other features and advantages of the present invention will be explained in the following description of the invention having reference to the appended drawings.

OBJECTS OF THE INVENTION

It is a primary object of the application to provide a system and method for contactless charging, tracking and monitoring a sealed asset or equipment that requires minimum hardware footprint, provides high power efficiency and minimum interference effects, at low cost and interoperability.

It is another object of the application to provide a method for contactless charging of rechargeable batteries which permits multiple handheld devices (using rechargeable sealed battery), to be simultaneously charged and remotely tracked over wireless using one network connected active RFID reader as transmitter/interrogator and circuitry embedded in those devices with single small antenna.

It is another object of the application to provide a novel system to facilitate sealed sterilization enabled equipments such as medical equipments to be simultaneously battery charged and remotely tracked as well as actuated over wireless using only one network connected Transceiver as external charger/interrogator.

It is another object of the application to provide a UHF RFID tag that may act both as a passive RFID tag or active RFID tag and providing a unique identification for the device to which the tag is attached.

It is also an object of the present application to provide a system for activating device for charging over single wireless RF and the device is provided with an active sensor system that can sense the critical parameters related to the device.

Yet another object of the present application is to provide a system and method for continuously monitoring one or multiple devices for location information, Status of battery charging, relevant Sensory data inputs such as temperature inside the device, and the like.

SUMMARY OF THE INVENTION

Before the present methods, systems, and hardware enablement are described, it is to be understood that this invention in not limited to the particular systems, and methodologies described, as there can be multiple possible embodiments of the present invention which are not expressly illustrated in the present disclosure. It is also to be understood that the terminology used in the description is for the purpose of describing the particular versions or embodiments only, and is not intended to limit the scope of the present invention which will be limited only by the appended claims.

Embodiments of the present invention are directed to a system for simultaneous wireless charging, auto tracking and monitoring of one or multiple enclosed equipments from a remote management server by using one single RF reader and one single antenna enclosed in said equipment. Moreover, each equipment is usually completely shielded and not accessible to the users & preferably tamper-proof. Therefore, status monitoring of the equipment and triggering basic functionality over a wireless is an important necessity. Moreover, an anomaly detection method is provided for monitoring a plurality of equipment related parameters such as monitoring the presence/absence of the device on a particular location, controlling the battery charging (when and how much). For example, in case one or some such equipments are misplaced or fraudulently removed or seal broken off or some parameter not within constraint boundaries, the management server may automatically generate alarms.

Figure 1:
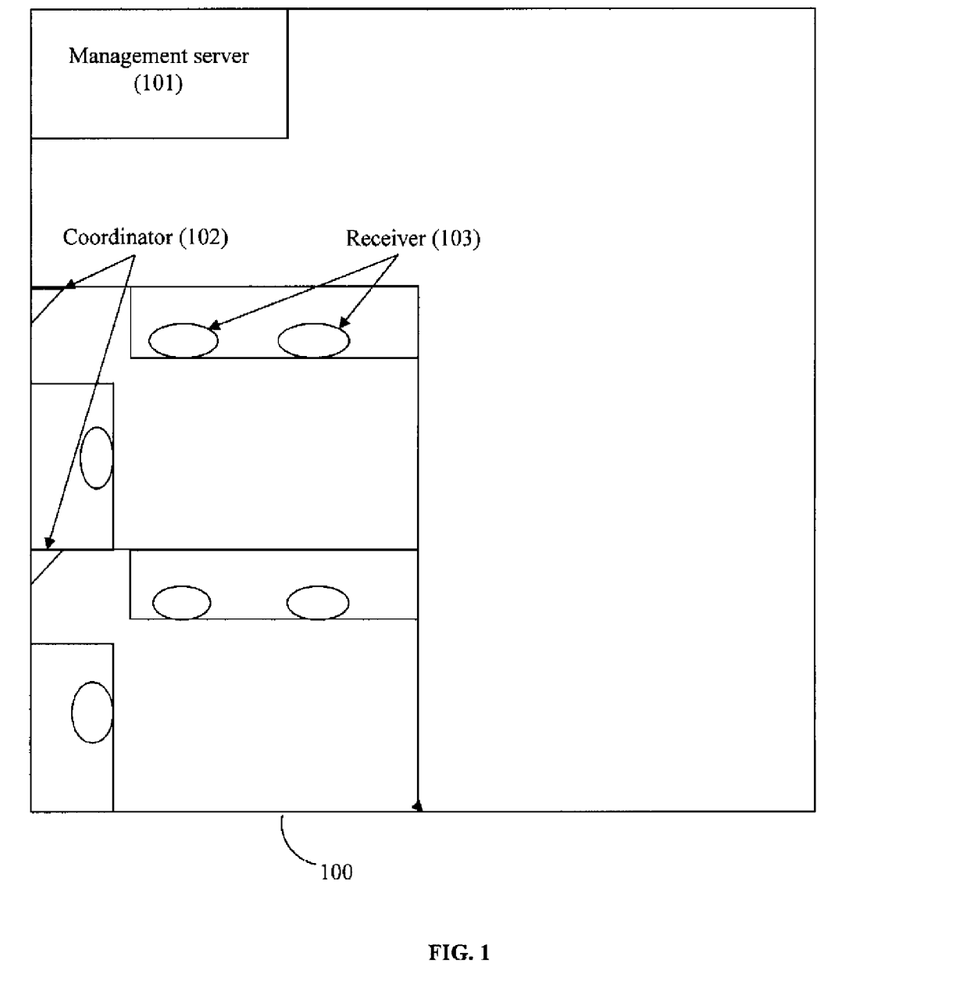
FIG. 1 illustrates the various components of a system for wirelessly charging, tracking and monitoring a plurality of equipments according to an embodiment.

In an embodiment, the system may comprise of a management server (101), one or more coordinators and one or more receivers. The management server is communicatively coupled with said coordinator and actuates the same to transmit UHF radio waves. The coordinator is also communicatively coupled with said receiver that in turn is electrically and communicatively coupled with the equipment. The receiver is enclosed inside said equipment and is adapted to receive the UHF radio waves transmitted by said coordinator. In an aspect, the system as described may deployed in a hospital wherein the management server is a hospital management system/server and said one or more equipment are sealed medical equipments. The coordinator may comprise of a transceiver for short range data communication and a UHF antenna. Moreover, the coordinator may be adapted to transmit UHF radio waves in ISM band and preferably in frequency band of 902-915 MHz at transmitting power levels of +36 dBm.

The receiver enclosed inside said equipment may comprise of one single UHF receiver antenna, a power divider, a wireless charging subsystem and a monitoring and tracking subsystem. The UHF receiver antenna is adapted to receive and transmit UHF radio signal. In an embodiment, the UHF receiver antenna may be a flexible UHF antenna. Further, the power divider is adapted to divide the received UHF radio signal from UHF receiver antenna and transmit a first part of the UHF radio signal to the wireless charging subsystem and a second part of the UHF radio signal to the monitoring and tracking subsystem. The wireless charging subsystem essentially comprises of a wireless charging circuit, a buffer and controller circuit and a battery pack. The wireless charging circuit converts the received first part of the UHF radio signal to DC power and transmits the DC power to the buffer and controller circuit. In an embodiment, the wireless charging circuit may include a power harvesting integrated circuit chip such as P2110 by Powercast™. The buffer and controller circuit further transmits the DC power to the battery pack for charging and also provides DC power for activating the RFID tag. Further, the monitoring and tracking subsystem essentially comprises of a programmable delay unit, an RFID tag and one or more sensors. The programmable delay unit provides a time delay to the second part of the received UHF radio signal and transmits the UHF radio signal to the RFID tag once it is activated by the DC power supplied from the buffer and controller circuit. The RFID tag is communicatively coupled with said one or more sensors to receive one or more operational parameters related to the equipment and transmit the same via UHF receiver antenna to the coordinator that further transmits the operational parameters to the management server. In related embodiment, the one or more sensors may be sensor enabled to detect any operational or sensory parameter related to the equipment such as a temperature sensor, humidity sensor, Battery Charge Sensor, and the like. In another embodiment, the RFID tag may comprise of a low power transceiver IC. The RFID tag may be a UHF active tag and more specifically a sensory tag.

In another embodiment, the equipment may be sealed usually by two compartments; the main compartment contains the device essentials and other part usually manufactured by using radio transparent plastic. These two are sealed by manufacturer with tamper protection strip. The equipment has rechargeable battery and battery pack for driving the device operation and wirelessly charged. The equipment can be sterilized during battery charging as the battery is charged wirelessly.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated that the conception and specific embodiment disclosed may be readily utilized as a basis for modifying or designing other structures for carrying out the same purposes of the present invention. It should also be realized that such equivalent constructions do not depart from the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF DRAWINGS

The foregoing summary, as well as the following detailed description of preferred embodiments, is better understood when read in conjunction with the appended drawings. For the purpose of illustrating the invention, there is shown in the present document example constructions of the invention; however, the invention is not limited to the specific methods and apparatus disclosed in the document and the drawing.

DETAILED DESCRIPTION OF THE INVENTION

Some embodiments of this invention, illustrating all its features, will now be discussed in detail.

The words "comprising," "having," "containing," and "including," and other forms thereof, are intended to be equivalent in meaning and be open ended in that an item or items following any one of these words is not meant to be an exhaustive listing of such item or items, or meant to be limited to only the listed item or items.

It must also be noted that as used herein and in the appended claims, the singular forms "a," "an," and "the" include plural references unless the context clearly dictates otherwise. Although any systems and methods similar or equivalent to those described herein can be used in the practice or testing of embodiments of the present invention, the preferred, systems and methods are now described.

The disclosed embodiments are merely exemplary of the invention, which may be embodied in various forms.

The present application describes a novel system for simultaneous charging, auto-identification and tracking of one or more devices/assets having sealed battery enclosed, using a SRD (Short Range Data) transceiver also referred to as Coordinator in the instance. A plurality of equipments/devices commonly used in various domains specifically electro-mechanical devices such as surgical equipments are battery driven wherein the entire battery pack is completely sealed inside the device. Specifically in case of medical instruments where sterile environment is essential an aseptic transfer of charging power is required. Such devices or equipments are also provided with an RFID tag that provides a unique ID (like EPC Global) with the help of which the device may be uniquely identified. Moreover, suitable active sensory systems may be provided that may sense critical parameters related to the device, and store such parameters and may also deliver such information to a remote server using a nearby coordinator, when required.

FIG. 1 according to an embodiment illustrates a system (100) for simultaneous charging, tracking and monitoring of one or more devices/assets. Such a system for example, may be employed in a hospital comprising of a Hospital Management server, a plurality of medical equipments driven by an enclosed battery. A plurality of coordinators coordinators (102) is employed at strategic locations enabling the coordinators (102) to transmit a radio wave at an ultra high frequency. Such radio waves transmitted by the coordinator (102) are received by a receiver (103). The receiver (103) is employed inside the equipment along with a required battery pack. The equipments may be stored on shelves in a specific zone depending upon their present utilization. The coordinators (102) are accordingly placed in the specific zone for transmitting radio waves to the receivers of equipments employed in a given zone. The coordinators (102) actuate the battery charging, tracking and monitoring of a plurality of equipments. In an embodiment, the coordinators may be enabled to communicate with a plurality of equipments such as equipments placed in a particular zone. A management server (101) is provided that initiates the transmission of radio waves from coordinators (102). The transmitted waves are in turn captured by the receiver employed in the equipment. The receiver may be a combination of a wireless charging board and an RFID tag sealed inside the equipment. In an aspect, the management server (101) may be a Hospital management server (HMS). In an embodiment, an active sensory system may be employed inside the equipments that may sense critical parameters related to the equipment.

Over a period of time, mainly night time, the equipments may get charged and the equipment ID provided by the RFID tag may also be available continuously. In another embodiment, the system may enable a two way communication between the equipment and the coordinator and notify the management server (101) about any anomaly such as the battery charge being low, any temperature difference inside the equipment, and the like. In yet another embodiment, the coordinator (101) may notify the management server (101) the equipment has been displaced from its original position, for example, the coordinator may notify the management server (101) in case an equipment is displaced from one zone to other.

The management server (101) is enabled to aggregate one or more sensory parameters related to a plurality of equipments received from a plurality of coordinators (101). The management server (101) may control individual medical devices when required. The management server (101) may also enable switching on battery charging for an equipment by employing the coordinator assigned for that zone. The management server (101) receives back the identification of the equipment and any related sensory parameter and track the presence/absence of the equipment in a given zone by utilizing the assigned coordinator and a two way communication connectivity between the management server (101) and the coordinator.

In another embodiment, the system (100) enable transmitting radio waves from coordinator (101) to sealed equipment and reading the unique ID associated with an RFID tag employed inside the equipment. The radio wave from the coordinator may be received by the receiver that may communicate back to the coordinator the unique ID, or one or more sensory parameters related to the equipment, on demand.

The system may permit single/multiple medical devices with sealed battery enclosed to be charged and tracked simultaneously using short range data protocol.

Figure 2:
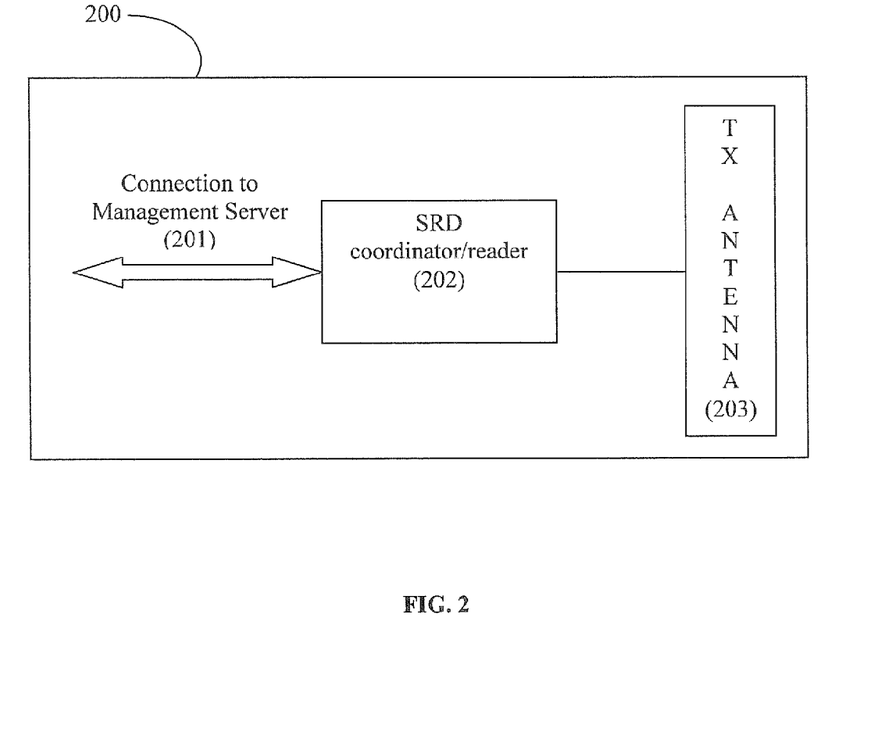
FIG. 2 illustrates the Transmitter Section according to an embodiment.

FIG. 2 according to an embodiment illustrates a coordinator (200) that transmits radio waves at ultra high frequencies. The coordinator (200) is deployed in one or more zones and is enabled to transmit radio waves to equipments positioned in corresponding zone. The coordinator (200) primarily consists of a Short Range Data (SRD) coordinator/reader (202) and a transmitter antenna (203). Transmitter Antenna (203) is also referred herein as Tx Antenna. The Short Range Data coordinator (202) and the transmitter antenna (203) are electrically coupled with each other. The Short Range Data coordinator (202) may work at ISM frequency band 433/868/915 MHz for Short Range Data operation. The Short Range Data coordinator (202) in conjunction with the transmitter antenna (203) enables a two communication between the equipments and the management server. The Short Range Data coordinator (202) employs spread spectrum protocols like Direct-sequence spread spectrum (DSSS) (at 902-915 MHz) at Transmitting power level of +36 dBm. The Short Range Data coordinator (202) may follow Short Range Data communication protocols or IEEE 802.15.4 protocol or any other standard protocol. The coordinator (200) is connected to the management server via an available connection (201). In an embodiment, the coordinator (200) may be connected to the management server over a wire line or wirelessly. The connection between the management server and the coordinator enables two-way communication. The management server actuates the coordinator to transmit radio waves that may be received by a receiver in the equipment. The coordinator (200) is also enabled to disseminate the data received from one or more sealed equipments in one particular zone to the management server. The system described herein works best at UHF ISM band i.e. 915 MHz with spread spectrum.

Figure 3:
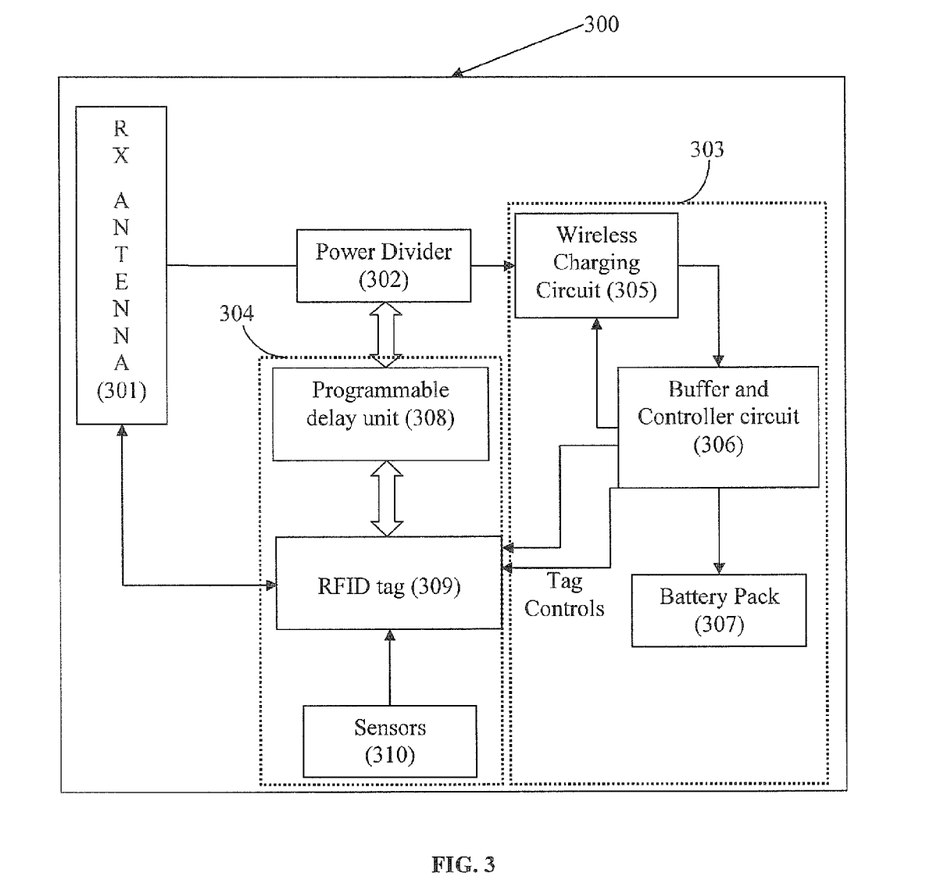
FIG. 3 illustrates an exploded view of the Receiver section enclosed in an equipment according to an embodiment.

FIG. 3 according to an embodiment illustrates a Receiver (300) section enclosed in the sealed equipment. The receiver section consists of a single small receiver antenna (301) to receive propagating UHF RF waves from the coordinator (200). In an embodiment, the receiver antenna (301) may be a flexible UHF antenna. The receiver antenna (301) is also referred herein as Tx Antenna.

The output of the receiver antenna (301) is divided and fed into two subsystems by employing a power divider (302). A first part of the divided RF energy is directed towards a wireless charging subsystem (303) and a second part is directed towards an monitoring and tracking subsystem (304). The wireless charging subsystem (303) converts the incident radio wave to DC power. The first part of the divided RF energy is input to a wireless charging circuit (305). The wireless charging circuit (305) converts the input RF energy to appropriate DC voltage. For example, the wireless charging circuit (305) may receive radio frequency at 902-928 MHz as input, such radio frequency is then converted to appropriate DC voltage of 4.2 V for charging batteries such as Li ion batteries. The wireless charging circuit (305) may employ commercially available RF energy harvesting ICs Such as P2110 from Powercast™ that are enabled to convert RF waves into DC power. The DC power as output from the wireless charging circuit (305) is inputted to a buffer and controller circuit (306). The buffer and controller circuit (306) provides DC voltage to the RFID tag that in turn actives the RFID tag (309). The buffer and controller circuit (306) may also be pre-programmed to enable the active RFID tag (309) to receive and/or transmit sensory information related to the equipment employing tag control interface. The buffer and controller circuit (306) charges a rechargeable battery pack (307) that supplies electrical energy to other electronic/electrical subsystems embodying the principle function of the equipment.

The Monitoring and tracking subsystem (304) consists of a programmable delay unit (308), an RFID tag (309) and one or more sensors (310). In an embodiment, the RFID tag (309) works on active mode i.e. with support of additional DC power. The second part of the RF energy from the power divider (302) is inputted in the programmable delay unit (308). The programmable delay unit (308) provides time delay to the RF wave before it reaches the RFID tag (309) to adjust potential delay in generation of the DC voltage at the wireless charging unit (305). The time delay is essential as the RFID tag (306) does not draw any power from the batter pack (307) and the residual power left in battery pack is used only for the equipment operation and not for activating the RFID tag. In an embodiment, the RFID tag (309) consists of a low power transceiver IC such as CC1101 from Texas Instruments™. The RFID tag (309) may also be connected to one or more sensors (310) such as temperature sensor, humidity sensor, and the like. In an embodiment the RFID tag (309) may be a UHF active sensory tag. In another related embodiment, the RFID tag (309) may be re-writable tag. In an embodiment, the RFID tag (309) may enabled to transmit to the coordinator information such as a unique ID related to the equipment, battery pack charging status, information regarding temperature/humidity/moisture content inside the equipment, and the like. In another embodiment, the RFID tag may also transmit to the coordinator confidential manufacturer data that may be security enabled. In yet another embodiment, the RFID tag may also send the information regarding device usage status such as number of uses done for a multi-use equipment.

The management server aggregates data from a plurality of equipments by utilizing the coordinators. In an embodiment, the management server may be enabled to monitor the presence/absence of any equipment, control the battery charging of the equipment. In case one or some such equipments are misplaced or fraudulently removed or some parameter not within constraint boundaries the management server may automatically generate alarms.

Figure 4:
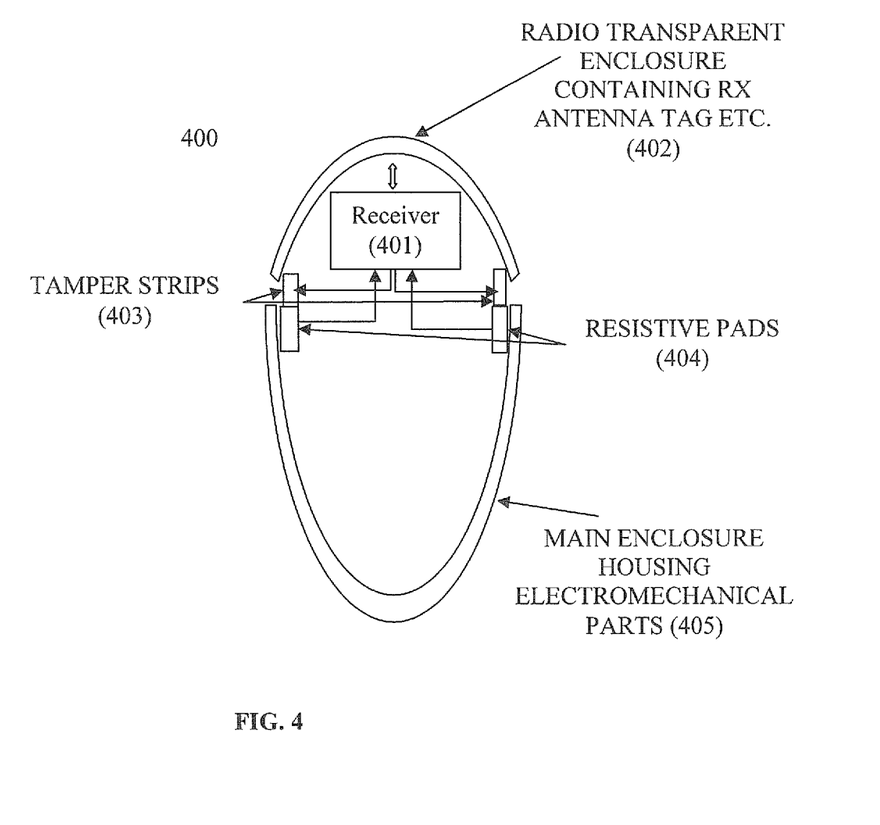
FIG. 4 illustrates an equipment enclosing a receiver section wherein a tamper protection system is provided.

FIG. 4 illustrates an equipment (400) enclosing a receiver (401) section wherein a tamper protection system is provided. The equipment (400) may be divided into two different enclosures a main enclosure (405) and a radio transparent enclosure (402). The main enclosure (405) provides housing for electromechanical parts of the equipment, and the radio transparent enclosure contains the receiver (401) section including at least the RFID tag, one or more sensors, wireless charging circuit etc. A tamper protection system is provided in the equipment that includes one or more tamper strips (403) and one or more resistive pads (404) such that the tamper strips and resistive pads seal the equipment along with the required battery pack and the receiver. The sealed equipment permits sealed sterilization that may be required by various equipments such as medical devices namely surgical equipments. Further, the enclosed equipment may be simultaneously battery charged and remotely tracked as well as actuated over wireless using only one network connected coordinator. The receiver (401) section may be provided with required sensory circuit that may enable detection of any change in the position of the tamper strips (403) with respect to the resistive pads (404) and thereby by detecting if the tamper protection seal is broken off. The RFID tag in the receiver section may also send an alarm to the management server if the tamper protection seal is broken. In an embodiment, the Radio transparent enclosure may be manufactured by using a radio transparent plastic.

The management server aggregates data for number of such equipments. It is used to monitor the presence/absence (location tracking) of the equipment, various sensory parameters related to the equipments, control the battery charging. If one or some such equipments are misplaced or fraudulently removed or seal broken off or some parameter not within constraint boundaries, management server automatically generates alarms.

The disclosed embodiments are merely exemplary of the invention, which may be embodied in various forms. Persons skilled in the art and technology to which this application pertains will appreciate that alterations and changes in the described structures and methods of operation can be practiced without meaningfully departing from the principle, spirit and scope.

We claim:

1. A system for simultaneous wireless charging, tracking and monitoring of at least one equipment, the system comprising: a management server, a coordinator and at least one receiver wherein said management server is communicatively coupled with said coordinator and actuates said coordinator to transmit Ultra High Frequency (UHF) radio waves;

said coordinator is communicatively coupled with the at least one receiver; and the at least one receiver is electrically and communicatively coupled with and enclosed inside said at least one equipment, wherein the at least one receiver receives the UHF radio waves transmitted by said coordinator, and wherein the at least one receiver further comprises:

a UHF receiver antenna to receive and transmit the UHF radio waves;

a power divider to divide the UHF radio waves and transmit a first part of the UHF radio waves to a wireless charging subsystem and a second part of the UHF radio waves to a monitoring and tracking subsystem, the wireless charging subsystem further comprising a wireless charging circuit, a buffer, a controller circuit and a battery pack;

wherein the wireless charging circuit converts the first part of the UHF radio waves to Direct Current (DC) power and transmit the DC power to the buffer and the controller circuit, and wherein said buffer and said controller circuit transmits the DC power for charging the battery pack and activates a Radio Frequency Identification (RFID) tag; and and wherein the monitoring and tracking subsystem comprises a programmable delay unit, the RFID tag and one or more sensors, wherein the programmable delay unit provides a time delay to the second part of the UHF radio waves and transmits the UHF radio waves to the RFID tag, and wherein the RFID tag is communicatively coupled with one or more sensors to receive one or more operational parameters related to said equipment by employing said one or more sensors and transmits the one or more operational parameters via the UHF receiver antenna.

2. The system as claimed in claim 1 wherein the management server is a hospital management server and said at least one equipment is sealed medical equipments.

3. The system as claimed in claim 1 wherein said coordinator comprises a transceiver for short range data communication and a UHF antenna.

4. The system as claimed in claim 1 wherein said coordinator transmits UHF radio waves in Industrial, Scientific And Medical (ISM) band.

5. The system as claimed in claim 1, wherein said UHF receiver antenna is a flexible UHF antenna.

6. The system as claimed in claim 1, wherein said wireless charging circuit comprises a Radio Frequency (RF) energy harvesting Integrated Circuit (IC).

7. The system as claimed in claim 1, wherein said one or more sensors are selected from the group consisting of temperature sensor, humidity sensor, and battery charge sensor.

8. The system as claimed in claim 1, wherein said RFID tag comprises a low power transceiver IC.

9. The system as claimed in claim 1, wherein said RFID tag is a UHF active tag.

10. The system as claimed in claim 9 wherein said RFID tag is a sensory tag.

11. A method for simultaneous wireless charging, tracking and monitoring one or more equipments, the method comprising actuating a coordinator using a management server for transmitting Ultra High Frequency (UHF) radio waves; and receiving the transmitted UHF radio waves by a receiver, wherein receiving the transmitted UHF radio waves by the receiver further comprises:

dividing, with a power divider, the UHF radio waves and transmit a first part of the UHF radio waves to a wireless charging subsystem and a second part of the UHF radio waves to a monitoring and tracking subsystem;

wherein the wireless charging subsystem further comprises a wireless charging circuit, a buffer, a controller circuit and a battery pack, wherein the wireless charging circuit converts the first part of the UHF radio signal to Direct Current (DC) power and transmit the DC power to the buffer and the controller circuit, and wherein said buffer and controller circuit transmits the DC power for charging the battery pack and activates a Radio Frequency Identification (RFID) tag; and wherein said monitoring and tracking subsystem comprises a programmable delay unit, the RFID tag and one or more sensors;

wherein the programmable delay unit provides a time delay to the second part of the UHF radio signal and transmits the UHF radio signal to the RFID tag, and wherein the RFID tag is communicatively coupled with one or more sensors to receive one or more operational parameters related to said equipment by employing said one or more sensors and is adapted to transmits the one or more operational parameters via the UHF receiver antenna.

12. The method as claimed in claim 11 wherein said one or more operational parameters related to said one or more equipments are selected from the group consisting of equipment battery status, position of the equipment, presence of the equipment in a prescribed location, humidity inside the equipment, temperature inside the equipment, unique Identification (ID) of an asset, confidential manufacturer data, and device usage status.

13. The method as claimed in claim 11 wherein said one or more operational parameters are transmitted from the receiver to coordinator by employing Direct-sequence spread spectrum protocol at transmitting power level of +36 dBm.

* * * * *